April 17, 1951   K. C. CRUMRINE   2,549,176
DETECTION OF SCATTERED NEUTRONS
Filed May 31, 1947
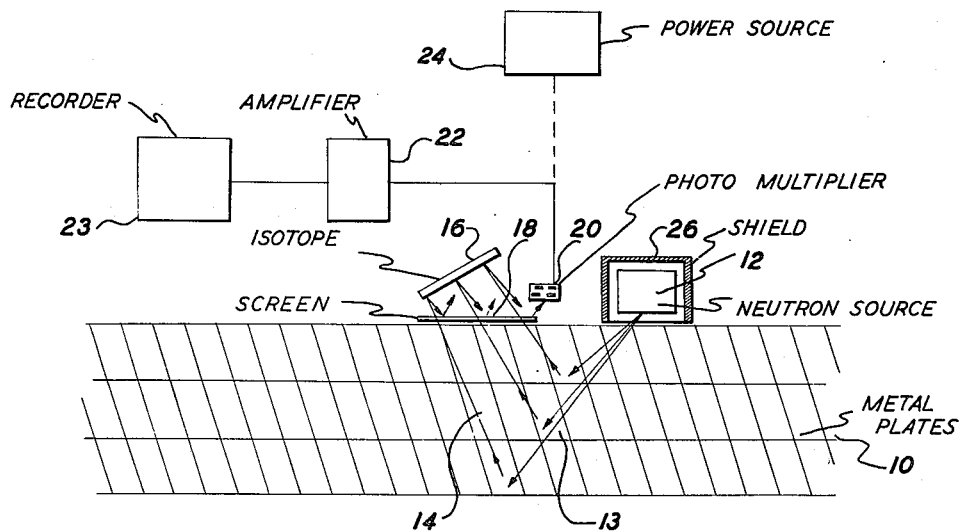
INVENTOR.
KENNETH C. CRUMRINE
BY
Daniel Stryker
ATTORNEY Patented Apr. 17, 1951

2,549,176

UNITED STATES PATENT OFFICE 2,549,176

DETECTION OF SCATTERED NEUTRONS

Kenneth C. Crumrine, Tulsa, Okla., assignor to The Texas Company, New York, N. Y., a corporation of Delaware Application May 31, 1947, Serial No. 751,506

9 Claims. (Cl. 250—71)

This invention relates to methods of and apparatus for the measurement of scattered neutrons, and is useful in wall thickness measurements, well logging and similar applications wherein scattered neutrons are detected.

Methods employing neutron bombardment find increasing application in the measurement of characteristics of various substances such as, for example, the character of rock strata encountered in drilling operations, and the character or thickness of the metal of the walls of metallic vessels, pipes and the like. The neutron bombardment is accomplished in different ways and the character of the formation is determined by various means. In one application, a source of fast neutrons such as a mixture of an alpha emitter, for example, radium, and a light element such as beryllium is employed to bombard a mass, whether it be mineral or metallic, with a flux of neutrons of high intensity. The neutrons entering the mass undergo elastic and inelastic collisions, whereby gamma rays are emitted. The determination of the character of the mass involves the simultaneous measurement of these instantaneously emitted gamma rays by a conventional gamma ray counter such as an ionization chamber, a Geiger-Müller counter, or the like. In another proposal, the neutron source is employed to transmute certain of the elements found in the formation into radioactive isotopes, which after removal of the source of fast neutrons will spontaneously decay with the liberation of gamma rays which may likewise be measured by the above mentioned counting instruments.

An additional phenomenon which occurs upon bombardment of a material with a flux of fast neutrons is the deflection or scattering of slow neutrons which are produced by the fast neutrons as they penetrate the formation. It is possible to measure the intensity of the back scattered slow neutrons simultaneously with the bombardment of the formation and to obtain therefrom significant information as to the composition or the thickness of the mass being bombarded.

The present invention provides a method of, and an apparatus for, the measurement of the intensity of back scattered slow neutrons, and is adapted to various applications, such as the determination of wall thicknesses of metallic vessels, well logging, etc. In general the method of measuring slow neutrons, according to my invention, comprises placing in the path of the slow neutrons a fissionable isotope, impinging the fission products resulting from the capture of the slow neutrons by the fissionable isotope upon a fluorescent material, whereupon photons are emitted. These are detected by a photo-sensitive device such as a photo-multiplier tube, and are amplified and recorded.

In the determination of the thickness of metal in accordance with the invention, the metal wall is subjected to bombardment with a flux of neutrons of comparatively high intensity. One result of this bombardment is the back scattering of slow neutrons which result from the loss of energy of fast neutrons due to collisions which the atoms within the metal wall. These back scattered slow neutrons are caused to impinge upon a fissionable isotope such as, for example, uranium$^{235}$, plutonium$^{239}$, and the like, to yield fission products.

Such fissionable isotopes as uranium$^{235}$, plutonium$^{239}$, will, when hit by a slow neutron, split into a series of fission products. Thus, uranium$^{235}$, which will have a mass of approximately$^{236}$ when the neutron is absorbed will split into a series of pairs of fission products. A number of fission products are unstable and emit beta rays. However, for the purposes of the present invention it is the fission products themselves which are of importance and not the beta radiation emitted therefrom.

The impingement of alpha particles upon a fluorescent substance, such as zinc-sulphide, produces photons which may be successfully detected by means of a photo-multiplier tube, or the like. It was found however, that the large fission fragments resulting from the action of the slow neutrons on the above mentioned fissionable isotopes, exhibit energies of considerably greater magnitude than alpha particles and thus produce a much greater intensity of light, when impinging on such fluorescent material, than is produced by impingement of alpha particles thereon.

The photons emitted from the fluorescent material upon impingement of the fission products thereon, are according to the present invention, picked up by an electron multiplier. The electron multiplier is a device in which the phenomenon of secondary emission is utilized to produce amplification of a small initial current. Electrons emitted from a photo-emissive cathode are attracted to a higher potential electrode. Each of these electrons upon striking the surface of the higher potential electrode knocks off several other electrons which are in turn drawn to an electrode of still higher potential. This process may be repeated several times, thus resulting in a greatly increased current flow from the last electrode. For example, if each impinging electron knocks off N secondary electrons and there are $n$ multiplication stages in the photo-multiplier tube being employed, the current will be $N^n$ as large as the original cathode emission. The principles and operation of photo-multiplier tubes are well known in the art and are described in standard text books thereon. A complete description of such a photo-multiplier tube is given in "Fundamentals of Vacuum Tubes," Eastman, second edition, pages 54 to 156.

The current originating in the photo-multiplier tube, may be amplified and recorded so as to give the measurement of the slow neutrons impinging upon the fissionable isotopes. This measurement can be correlated to the thickness of the metal surface by virtue of the fact that the back scattering of slow neutrons will be a function of the thickness of the metal being bombarded.

In a somewhat similar manner, characteristics of sub-surface formations adjacent a well bore may be determined. The back scattering of slow neutrons will be proportional to the relative percentage of elastic and inelastic collision taking place within the formation, which is in turn related to the character of the formation. Various elements vary in their characteristics with respect to neutron bombardment as to neutron capture, elastic and inelastic collisions and the like, and so the back scattering of slow neutrons therefrom may be employed to determine differences between formations containing various kinds or amounts of these elements.

The accompanying drawing is a schematic arrangement of apparatus for the accomplishment of the method of my invention.

As shown in the drawing, a neutron source 12 is placed in juxtaposition to a mass 10 (say a plate whose thickness is to be determined or the wall of a well being logged). The mass is bombarded for a short time with a flux of neutrons of high intensity. The neutron flux may be obtained as the product of an efficient alpha-neutron reaction occurring in a powdered mixture of an alpha emitter and beryllium, boron and the like. Either slow or fast neutrons may be employed for the bombardment. If it is desired to employ a source of slow neutrons, the neutron source such as the radium-beryllium mixture may be surrounded by a hydrogenous material which has the effect of slowing down the fast neutrons.

The neutron flux penetrating the mass 10 from the source 12 will undergo collisions within the mass and among the phenomena which will take place therein will be the deflection or back scattering of slow neutrons. The neutron flux or the fast neutrons are represented in the drawing by arrows 13 and the back scattered slow neutrons are represented by other arrows 14.

The slow neutrons are caused to impinge on a member 16 containing fissionable isotopes and cause the splitting of the fissionable isotopes as already described. For fissionable isotopes I may employ uranium$^{235}$, or plutonium$^{239}$. The fission products of the fissionable isotopes are directed against a fluorescent screen 18 and there produce photons which are registered on the photo-multiplier tube 20. The photo-multiplier tube 20 acts to multiply the electron emission from a photo-emissive electrode resulting from the impingement of the photons from the fluorescent screen thereon and the multiplied electron flow in the photo-multiplier tube is amplified by an amplifier 22 and recorded in the recorder 23.

The power source 24 is provided to feed the photo-multiplier, amplifier and recorder.

To complete the apparatus a shield such as the shield 26 is interposed between the neutron source and the fissionable isotope so as to prevent neutrons from the neutron source from traveling directly between the source and the isotope. This shield may comprise a sheet of cadmium, for example, which is capable of stopping all slow neutrons together with a layer of hydrogenous material such as paraffin to slow down the fast neutrons in order that they may not penetrate the cadmium sheet. Although the shield is shown as substantially surrounding the neutron source such is not a necessary feature provided only that the source is shielded from the detector. In this manner any fission of the fissionable isotope will be a direct result of the scattered neutrons from the formation.

Some materials, preferably zinc-sulphide, uranyl compounds, and the like, become luminous when exposed to radiation from a radioactive material, and the intensity of this radio-luminescense is (in the process of the present invention) proportional to the fission of the fissionable isotopes.

It is to be understood that any material capable of generating photons upon the impingement thereon of the fission products of the fissionable isotopes may be employed according to the present invention but zinc-sulphide and the uranyl compounds are the preferred materials for use in the fluorescent screen. Most efficient results are obtained when the apparatus is arranged to expose a large area of the fissionable material close to the fluorescent material, while using a large quantity of fissionable material and collecting as much of the fluorescent light as possible on one or more photo-multipliers. For this purpose optical systems may be employed to direct the fluorescent light onto the photo-multiplier tube or tubes. A close proximity of the fissionable material and the fluorescent materials is necessary to the method of the invention inasmuch as the range of travel of the fission products resulting from the capture of slow neutrons by the fissionable isotopes is relatively short and the fluorescent material must be within this range.

I have disclosed a method of measuring the magnitude of back scattered radiation of slow neutrons which comprises the capture thereof by a fissionable isotope, the impinging of the fission products of the fissionable isotopes on a fluorescent screen and the registration of the photons generated by the fluorescent screen on a photo-multiplier. It is apparent that this method may be employed in many applications in addition to those herein set forth.

The present invention includes within its scope not only the method of measuring the magnitude of slow neutrons but likewise the means of application of this method to measurement of wall thicknesses, sub-surface characteristics and the like, substantially as described and claimed.

I claim:

1. A method for determining the characteristics of a substance evidenced by the magnitude of the back scattering of neutrons which comprises bombarding said substance for a given period with a continuous flux of neutrons to bring about a back scattering of slow neutrons, causing the scattered slow neutrons to contact a fissionable isotope, causing the fission products resulting from said contact to impinge upon a fluorescent material to cause photon emission, converting the photons emanating from said fluorescent material to an electric current, amplifying said current and determining the magnitude thereof.

2. A method according to claim 1 in which the fissionable isotopes are selected from the group consisting of uranium$^{235}$ and plutonium$^{239}$.

3. A method for determining the characteristics of a substance which comprises bombarding said substance evidenced by the magnitude of the back scattering of neutrons for a given period with a continuous flux of neutrons, causing the resulting back scattered neutrons returning therefrom to contact a material selected from the class consisting of uranium$^{235}$ and plutonium$^{239}$, causing the fission products resulting from said contact to impinge upon a fluorescent material selected from the class of compounds consisting of zinc-sulphide and the uranyl compounds, and measuring the magnitude of the photon emission induced in said fluorescent material by the impingement of said fission products thereon.

4. An apparatus for determining the characteristics of a substance as evidenced by the magnitude of the back scattering of neutrons which comprises a source of neutrons, a bed of fissionable materials separated from said source of neutrons by a neutron impenetrable shield, a fluorescent screen in proximity to said bed of fissionable material, a photo-multiplier tube in association with said fluorescent screen, an amplifier in circuit with said photo-multiplier tube and a recorder in circuit with said amplifier.

5. An apparatus for determining the characteristics of a substance as evidenced by the magnitude of the back scattering of neutrons which comprises a source of a flux of neutrons, a bed of fissionable materials selected from the class of materials consisting of uranium$^{235}$ and plutonium$^{239}$, means disposed between said neutron source and said bed of fissionable materials preventing the flow of neutrons directly therebetween, a fluorescent screen comprising materials selected from the class of materials consisting of zinc-sulphide and the uranyl compounds located in proximity to said bed of fissionable materials, a photo-multiplier tube in association with said fluorescent screen and adapted to convert the photons emitted by said fluorescent screen to an electric current, means in association with the output of said photo-multiplier tube to amplify said electric current and means in association with said last named means to record said amplified electric current.

6. An apparatus for determining the characteristics of a substance as evidenced by the magnitude of the back scattering of neutrons which comprises a source of a flux of neutrons, a bed of fissionable materials selected from the class of materials consisting of uranium$^{235}$ and plutonium$^{239}$, means disposed between said neutron source and said bed of fissionable materials preventing the flow of neutrons directly therebetween, a fluorescent screen comprising materials selected from the class of materials consisting of zinc-sulphide and the uranyl compounds located in proximity to said bed of fissionable materials, a plurality of photo-multiplier tubes in association with said fluorescent screen and adapted to convert the photons emitted by said fluorescent screen to an electric current, means in association with the output of said photo-multiplier tubes to amplify said electric current and means in association with said last named means to record said amplified electric current.

7. In apparatus for determining the characteristics of a body evidenced by the magnitude of the back scattering of neutrons, the combination which comprises a fissionable material disposed adjacent the body, a source of neutrons so disposed with reference to the body and the fissionable material that the neutrons strike the body and back-scatter to come in contact with the fissionable material as slow neutrons, so that the slow neutrons are captured by the fissionable material with release of fission products, means for detecting the fission products, and means for preventing neutrons from passing directly from the source to the fissionable material.

8. In apparatus for determining the characteristics of a body evidenced by the magnitude of the back scattering of neutrons, the combination which comprises a fissionable material disposed adjacent the body, a source of neutrons so disposed with reference to the body and the fissionable material that the neutrons strike the body and back-scatter to come in contact with the fissionable material as slow neutrons, so that the slow neutrons are captured by the fissionable material with release of fission products, means for detecting the fission products including a fluorescent screen so disposed with respect to the fissionable material that the fission products impinge upon the screen, and means for preventing neutrons from passing directly from the source to the fissionable material.

9. In apparatus for determining the characteristics of a body evidenced by the magnitude of the back scattering of neutrons, the combination which comprises a fissionable material disposed adjacent the body, a source of neutrons so disposed with reference to the body and the fissionable material that the neutrons strike the body and back-scatter to come in contact with the fissionable material as slow neutrons, so that the slow neutrons are captured by the fissionable material with release of fission products, means for detecting the fission products including a fluorescent screen disposed between the body and the fissionable material, and means for preventing neutrons from passing directly from the source to the fissionable material.

KENNETH C. CRUMRINE.

REFERENCES CITED

The following references are of record in the file of this patent:

UNITED STATES PATENTS

| Number | Name | Date |
|---|---|---|
| 2,277,756 | Hare | Mar. 31, 1942 |
| 2,279,023 | Kallmann | Apr. 7, 1942 |
| 2,303,688 | Fearon | Dec. 1, 1942 |
| 2,303,709 | Siegert | Dec. 1, 1942 |
| 2,305,452 | Kallmann et al. | Dec. 15, 1942 |
| 2,337,465 | Heigl | Dec. 21, 1943 |
| 2,344,042 | Kallmann et al. | Mar. 14, 1944 |
| 2,351,028 | Fearon | June 13, 1944 |
| 2,390,433 | Fearon | Dec. 4, 1945 |
| 2,408,230 | Shoupp | Sept. 24, 1946 |